(12) United States Patent
Muramatsu et al.

(10) Patent No.: US 8,219,150 B2
(45) Date of Patent: Jul. 10, 2012

(54) PORTABLE ELECTRONIC EQUIPMENT CAPABLE OF DISPLAYING CANDIDATE OF SCENE BASED ON FREQUENCY INFORMATION

(75) Inventors: Junichi Muramatsu, Tachikawa (JP); Masaaki Miyatake, Akishima (JP); Kenji Koyano, Hanno (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 967 days.

(21) Appl. No.: 12/001,197

(22) Filed: Dec. 10, 2007

(65) Prior Publication Data

US 2009/0017873 A1    Jan. 15, 2009

(30) Foreign Application Priority Data

Jul. 10, 2007 (JP) ............................... P2007-180909

(51) Int. Cl.
    *H04N 1/38* (2006.01)
(52) U.S. Cl. .................. 455/566; 348/14.01; 348/14.02; 348/14.03
(58) Field of Classification Search .................. 455/566; 340/14.01–14.07
    See application file for complete search history.

(56) References Cited

U.S. PATENT DOCUMENTS

| 7,707,509 | B2 | 4/2010 | Naono et al. |
| 2002/0158914 | A1* | 10/2002 | Kuth ........................... 345/810 |
| 2003/0022700 | A1* | 1/2003 | Wang ........................... 455/566 |

FOREIGN PATENT DOCUMENTS

| JP | 07-182130 A | 7/1995 |
| JP | 2004287702 A | 10/2004 |
| JP | 2006-287556 A | 10/2006 |
| JP | 2006303666 A | 11/2006 |
| JP | 2007-058737 A | 3/2007 |

OTHER PUBLICATIONS

Japanese Office Action as mailed Jun. 7, 2011 in related application # 2007-180909.
JP Office Action dated Mar. 27, 2012 as received in application No. 2007-180909.

* cited by examiner

*Primary Examiner* — Marcos Batista
(74) *Attorney, Agent, or Firm* — Maschoff Gilmore & Israelsen

(57) ABSTRACT

According to an aspect of the invention, there is provided a mobile phone including: a first storage configured to store transit information associated with a destination scene for each scene; a second storage configured to store frequency information representing a frequency as to a route passing through a source scene, a first scene transited from the source scene and a second scene transited from the first scene; a first display configured to selectably display a candidate of the second scene, depending upon a transition from the source scene to the first scene and upon the transit information; a second display configured to selectably display a candidate of the second scene, depending upon a transition from the source scene to the first scene and upon the frequency information; and a transit unit configured to transit from the candidate displayed to a scene of the candidate if the displayed candidate is selected.

4 Claims, 10 Drawing Sheets

FIG. 3

| SOURCE | DESTINATION |
|---|---|
| MAIN MENU | MAIL |
|  | WEB |
|  | DATA FOLDER |
|  | CAMERA |
|  | ... |
| SHORTCUT | MAIL |
|  | WEB |
|  | DATA FOLDER |
|  | DATA TRANSFER |
|  | ... |
| MAIL | MAIL BOX |
|  | MAIL TRANSMISSION |
|  | SERVER SETTING |
|  | MAIL SETTING |
|  | ... |
| DATA FOLDER | PHOTO |
|  | MOVIE |
|  | MUSIC |
|  | ANIMATION |
|  | ... |
| WAIT | MAIL |
|  | WEB |
|  | DATA FOLDER |
|  | CALL |
|  | ... |
| DATA TRANSFER | DATA FOLDER |
|  | MEMORY CARD |
| MAIL TRANSMISSION | DATA FOLDER |
|  | TELEPHONE DIRECTORY |
| ... | ... |

30a — SOURCE column
30 — table
30b — DESTINATION column

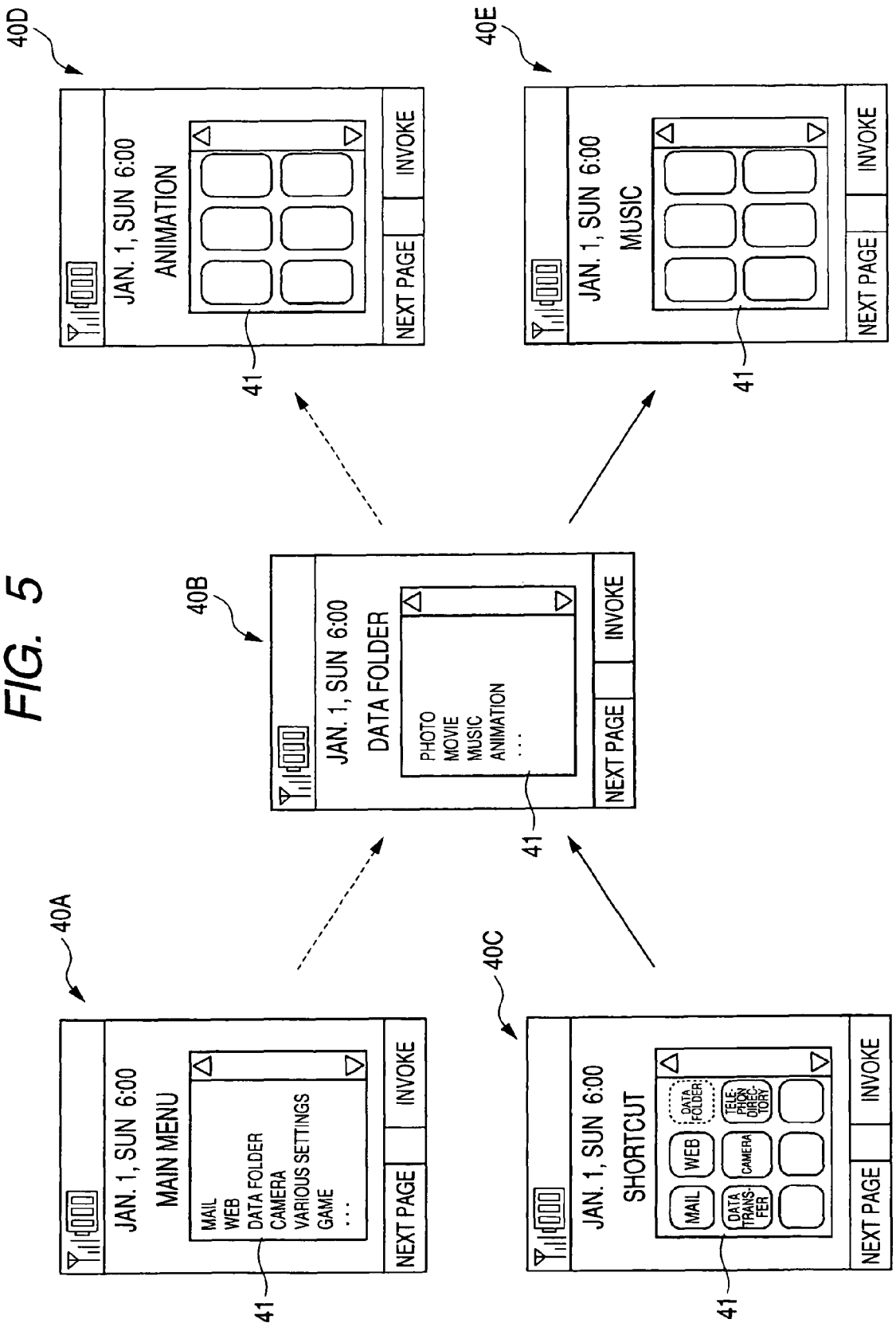

FIG. 6

| SOURCE | FIRST DESTINATION | SECOND DESTINATION | USE FREQUENCY |
|---|---|---|---|
| MAIN MENU | MAIL | MAIL BOX | 5 |
| MAIN MENU | MAIL | MAIL TRANSMISSION | 4 |
| MAIN MENU | MAIL | SERVER SETTING | 3 |
| MAIN MENU | MAIL | MAIL SETTING | 2 |
| MAIN MENU | DATA FOLDER | ANIMATION | 18 |
| MAIN MENU | DATA FOLDER | MOVIE | 7 |
| MAIN MENU | DATA FOLDER | PHOTO | 6 |
| MAIN MENU | DATA FOLDER | MUSIC | 2 |
| SHORTCUT | MAIL | MAIL TRANSMISSION | 23 |
| SHORTCUT | MAIL | MAIL BOX | 14 |
| SHORTCUT | MAIL | SERVER SETTING | 5 |
| SHORTCUT | MAIL | MAIL SETTING | 4 |
| SHORTCUT | DATA FOLDER | MUSIC | 22 |
| SHORTCUT | DATA FOLDER | MOVIE | 21 |
| SHORTCUT | DATA FOLDER | PHOTO | 19 |
| SHORTCUT | DATA FOLDER | ANIMATION | 7 |
| MAIL TRANSMISSION | DATA FOLDER | PHOTO | 28 |
| MAIL TRANSMISSION | DATA FOLDER | ANIMATION | 12 |
| MAIL TRANSMISSION | DATA FOLDER | MOVIE | 0 |
| MAIL TRANSMISSION | DATA FOLDER | MUSIC | 0 |
| DATA TRANSFER | DATA FOLDER | MOVIE | 20 |
| DATA TRANSFER | DATA FOLDER | PHOTO | 16 |
| DATA TRANSFER | DATA FOLDER | ANIMATION | 15 |
| DATA TRANSFER | DATA FOLDER | MUSIC | 4 |
| WAIT | MAIL | MAIL BOX | 27 |
| WAIT | MAIL | MAIL TRANSMISSION | 14 |
| WAIT | MAIL | SERVER SETTING | 3 |
| WAIT | MAIL | MAIL SETTING | 2 |
| WAIT | DATA FOLDER | MUSIC | 2 |
| WAIT | DATA FOLDER | MOVIE | 21 |
| WAIT | DATA FOLDER | PHOTO | 15 |
| WAIT | DATA FOLDER | ANIMATION | 14 |
| ... | ... | ... | ... |

PORTABLE ELECTRONIC EQUIPMENT CAPABLE OF DISPLAYING CANDIDATE OF SCENE BASED ON FREQUENCY INFORMATION

CROSS-REFERENCE TO RELATED APPLICATIONS

This application is based on and claims the benefit of priority from the prior Japanese Patent Application No. 2007-180909, filed on Jul. 10, 2007; the entire contents of which are incorporated herein by reference.

TECHNICAL FIELD

The present invention relates to a mobile phone that presents a destination candidate to the user when performing scene-to-scene transition, and more particularly to a mobile phone that determines a destination candidate depending upon the use frequency of the route of scene-to-scene transition and presents it thereby relieving the user of the burden in the operation of scene-to-scene transition.

BACKGROUND

Recently, there is a drastic increase in the function and storage capacity mounted on small-sized devices such as mobile phones. However, there is less change in the form and input/output interface of the apparatus for securing the portability of the device. This is because screen area and button types are restricted by far greater for the small-sized device, such as the mobile phone, as compared to those of the general-purpose computer. Consequently, the small-sized device, such as the mobile phone, requires many scene-to-scene transitions in order to select and invoke a desired function as well as frequent scrolling of the scene in order to find out a desired file, thus involving a problem of taking time and labor in operation.

It is disclosed by, for example JP-A-2006-287556, that the user is allowed to set up a function without the repetition of troublesome menu selections by preferentially displaying a menu highly frequent to use upon selecting and invoking the function). In the mobile phone, user's use history is recorded to produce an operation screen with menu items highly frequent to use and setting information items by ignoring the hierarchical relationship of menus, thereby improving the usability for the user to establish a functional setting.

With a method to preferentially display a menu item highly frequent in use and setting information, operation burden can be relieved upon using an item the user usually uses frequently. However, the finally selected item, in many cases, relies upon the route up to displaying the relevant item instead of upon the use frequency of the item itself. This is because the user, in many cases, makes an operation by use of a route fixed to a certain extent when he/she invokes a predetermined item.

For example, in the case of invoking a mail function upon waiting on the mobile phone, it is often the case to finally invoke a scene for reading a reception mail. On the contrary, when invoked from a menu screen, it is often the case to invoke a scene for preparing an outgoing message. Thus, there are frequent cases that the finally invoked scene differs depending upon the route of scene-to-scene transition. In such a case, mere extraction of a item highly frequent in use des not lead to a full omission of user's operation time and labor in scene-to-scene transition on the mobile phone, requiring the improvement of usability still more.

SUMMARY

According to an aspect of the invention, there is provided a mobile phone including: a first storage configured to store transit information associated with a destination scene for each scene among a plurality of scenes which are transited through on the mobile phone; a second storage configured to store frequency information representing a frequency as to a route passing through a source scene, a first scene which is transited from the source scene and a second scene which is transited from the first scene, in order; a first display configured to selectably display a candidate of the second scene, depending upon a transition from the source scene to the first scene and upon the transit information; a second display configured to selectably display a candidate of the second scene, depending upon a transition from the source scene to the first scene and upon the frequency information; and a transit unit configured to transit from the candidate of the second scene displayed by either one of the first display and the second display to a scene of the candidate of the second scene if the displayed candidate of the second scene is selected.

BRIEF DESCRIPTION OF THE DRAWINGS

In the accompanying drawings:

FIG. 3 is a data structure figure showing scene-to-scene transit information;

FIG. 5 is a scene-to-scene transition figure for explaining the scene-to-scene transition in the mobile phone;

FIG. 6 is a data structure figure showing the scene-to-scene transit frequency information;

DESCRIPTION OF THE EMBODIMENTS

Figure 1:
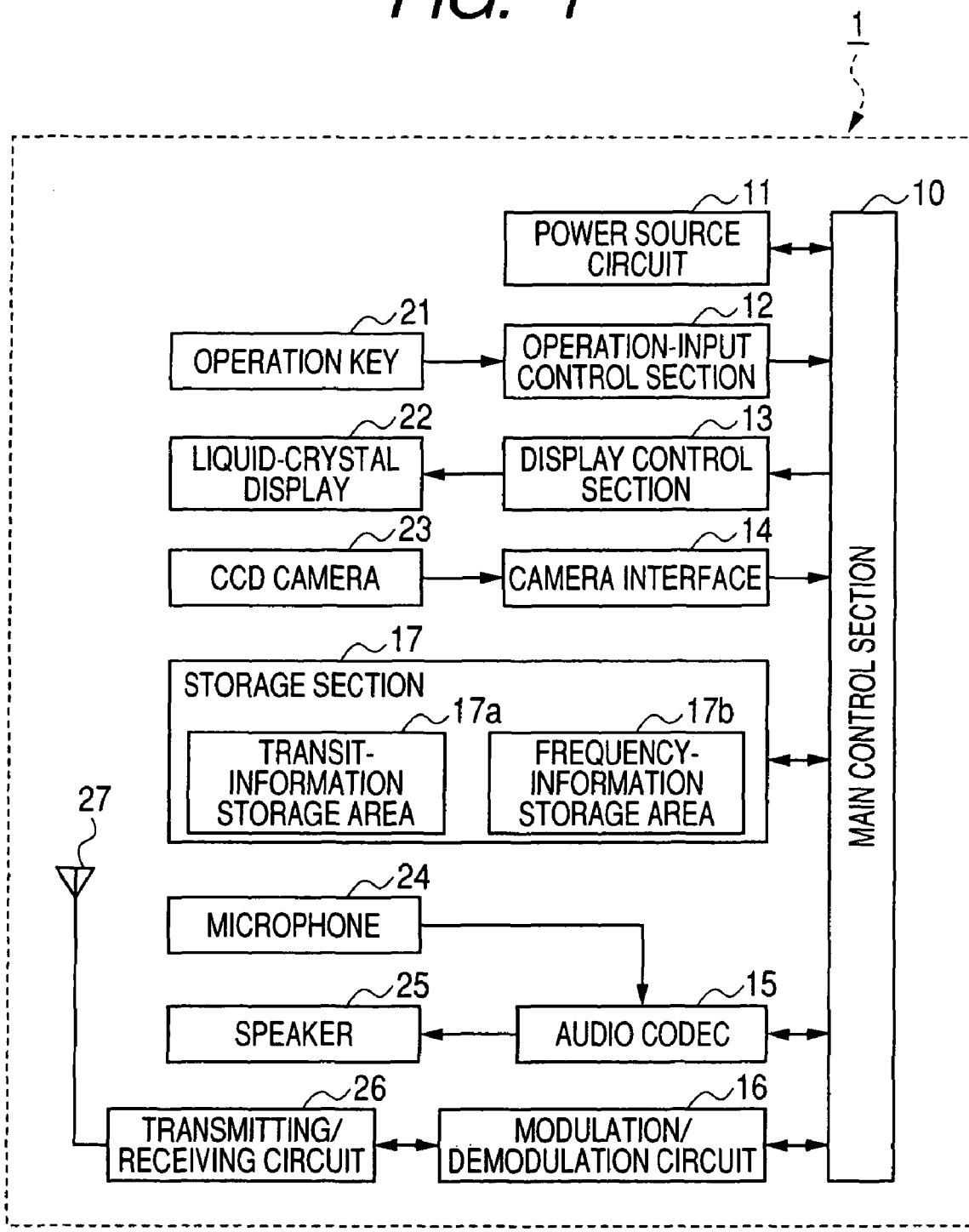
FIG. 1 is a functional block diagram of a mobile phone according to an embodiment of the present invention.

While referring to the appended drawings, explanation will be made on a mobile phone according to an embodiment the present invention. According to the embodiment, FIG. 1 shows a block diagram of a mobile phone 1. The mobile phone 1 is configured with a main control section 10, a power-source circuit 11, an operation-input control section 12, a display control section 13, a camera interface 14, an audio codec 15, a modulation/demodulation circuit 16 and a storage section 17, which are connected one with another through a bus.

The main control section 10 has a CPU (central processing unit), to take total control of the mobile phone 1 and to implement scene-to-scene transition processes and other arithmetic operations and control processes. The power source circuit 11 is to switch on/off the power source depending upon the user's input through the operation key 21. When the power source is on, power is supplied from a power source (e.g. battery) to various sections thereby placing the mobile phone 1 operable.

The operation-input control section 12 has an input interface, to convey the data, inputted by the operation key 21, to the main control section 10. The display control section 13 has a display interface, to display document data, image data and the like on a liquid-crystal display 22 under control of the main control section 10. The camera interface 14 is to input an image signal taken by a CCD camera 23.

The camera interface 14 has an image encoder (not shown). The image encoder is to compress and encode the image signal, inputted by the CCD camera 23, into an image signal according to a predetermined encode scheme, e.g. JPEG (joint photographic experts group) or MPEG (moving picture experts group), and to convert an coded image signal to that of another encode scheme and produce a new image signal, under control of the main control section 10.

The camera interface 14 has an image decoder (not shown). The image decoder is to decode a coded image signal according to a predetermined encode scheme thereby producing a reproduced image signal and to convey the reproduced image signal to the display control section 13. The display control section 13 is to output the produced image signal onto the liquid-crystal display 22.

The mobile phone 1 is to have voice communication with another mobile phone 1, for example, through a base station (not shown). Namely, the audio codec 15 is to produce an analog speech signal from the talk gathered by a microphone 24, under control of the main control section 10. Inputting an analog signal from the audio coded 15 in voice communication, the modulation/demodulation circuit 16 converts the signal into a digital signal and delivers it to a transmitting/receiving circuit 26. The transmitting/receiving circuit 26 is to send the digital speech signal to the base station through an antenna 27. The modulation/demodulation circuit 16 is to convert the digital speech signal, the transmitting/receiving circuit 26 received from the base station through the antenna 27, into an analog speech signal. In voice communication, the audio codec 15 is to acquire the analog speech signal from the modulation/demodulation circuit 16 and output it as a speech through the speaker 25.

Meanwhile, the mobile phone 1 is to execute a data communication processing with another mobile phone or communication terminal. Namely, the mobile phone 1 is to perform various transmission/reception processes of data, including electronic mails and Web browsing data, image data and video data. When receiving data, the main control section 10 restores data by performing, at the modulation/demodulation circuit 16, an inverted spread-spectral processing on the signal, the transmission/reception circuit 26 received from the base station through the antenna 27. According to the instruction from the main control section 10, the data is displayed on the liquid-crystal display 22 through the display control section 13, recorded in the storage section 17 or so. When sending data inputted through the operation-input section 12 or stored in the storage section 17, the main control section 10 controls the modulation/demodulation circuit 16 to perform a spread spectral processing on the data and the transmitting/receiving circuit 26 to send it to the base station through the antenna 27.

The storage section 17 is configured with a ROM (read only memory) that stores programs to be processed by the main control section 10 and the data required for processing, a hard disk, a nonvolatile memory, a RAM that temporarily stores the data to be used upon processing of the main control section 10, and so on. The program, for the main control section 10 to execute scene-to-scene transition referred later, is stored in the ROM for example.

Figure 2:
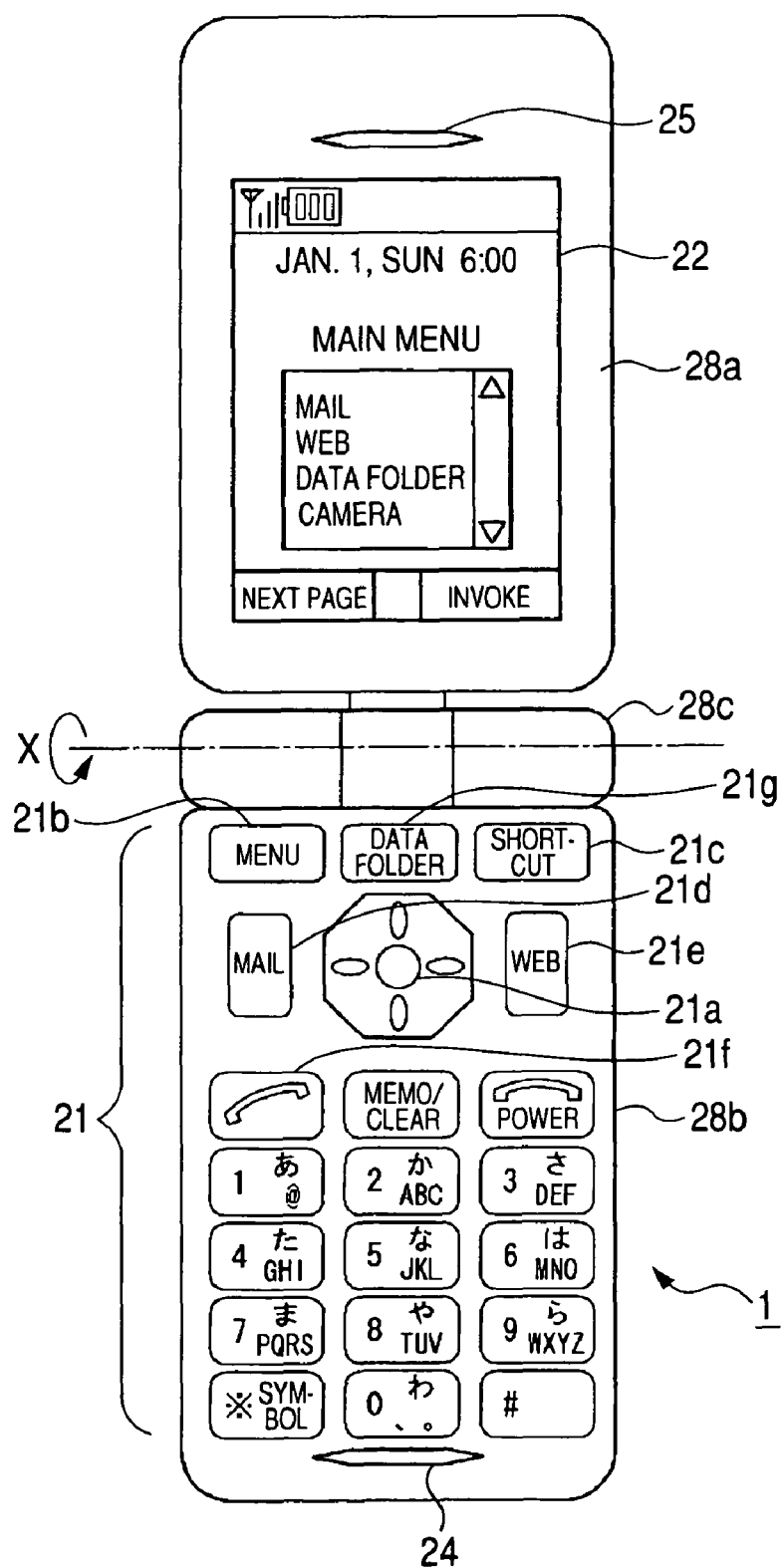
FIG. 2 is an exterior view of the mobile phone according to the embodiment, as viewed from front.

FIG. 2 shows an exterior view of a foldable mobile phone to be used in explaining an example of the mobile phone 1, in a sate opened at approximately 120 degrees as viewed from front. The mobile phone 1 includes a first casing 28a and a second casing 28b that are joined together through a hinge 28c. The first and second casing 28a, 28b are formed rotatable in an X direction about the hinge 28c.

A liquid-crystal display 22 is provided in the center of the first casing 28a. The liquid-crystal display 22 is to display various screens including a menu screen 40A and a shortcut screen 40C. In the first casing 28a, a speaker 25 is provided in the upper to the liquid-crystal display 22, thus allowing the user to listen a speech. Meanwhile, in the second casing 28b, a microphone 24 is provided in the lower to the operation key 21 so that user's speech can be gathered during communication by the microphone 24.

On the second casing 28b, operation keys 21 are provided including a cross key 21a for moving the cursor or the screen entirety in directions of up, down, left and right, a menu key 21b for displaying a main menu screen 40A, a shortcut key 21c for displaying a shortcut screen 40C, a mail key 21d for displaying a mail screen, a Web key 21e for displaying a Web screen, a call key 21f for making a call, and a data folder key 21g for transition into a data folder screen 40B and so on, in addition to the numeral keys "0"-"9" for inputting a numeral. The use is allowed to transit from a "standby" scene to various scenes by pressing those operation keys 21.

The mobile phone 1 possesses a plurality of displays (hereinafter, referred to as "scenes") for processing a process so that various scenes can be invoked in accordance with the processing carried out in the mobile phone 1. Herein, the displays includes scenes which can transit with each other among the scenes described hereinafter when a key operation is made by user, and each of the scenes has a destination scene to which a scene transits and a source scene which from the scene is transited. Each of the scenes is associated with a plurality of scenes to be selected as a destination in a scene-to-scene transition. In case a predetermined scene is invoked on the mobile phone 1, plural scenes are presented as a destination the user is allowed to select. By user's selection of a desired scene to transit out of the plurality of scenes, transition is done to the next scene. This is the processing of scene-to-scene transition.

The storage section 17 has a transition-information storage area 17a storing scene-to-scene transit information 30 for executing such a scene-to-scene transition. The scene-to-scene transit information 30 is representative of a source in transiting the scene on the mobile phone 1 and a destination to which transition is possible from the source. As shown in FIG. 3, association is provided between source information 30a representative of source and one or a plurality of pieces of destination information 30b representative of a destination, thus allowing the mobile phone 1 to execute a scene-to-scene transition process depending upon the scene-to-scene transit information 30.

Figure 4:
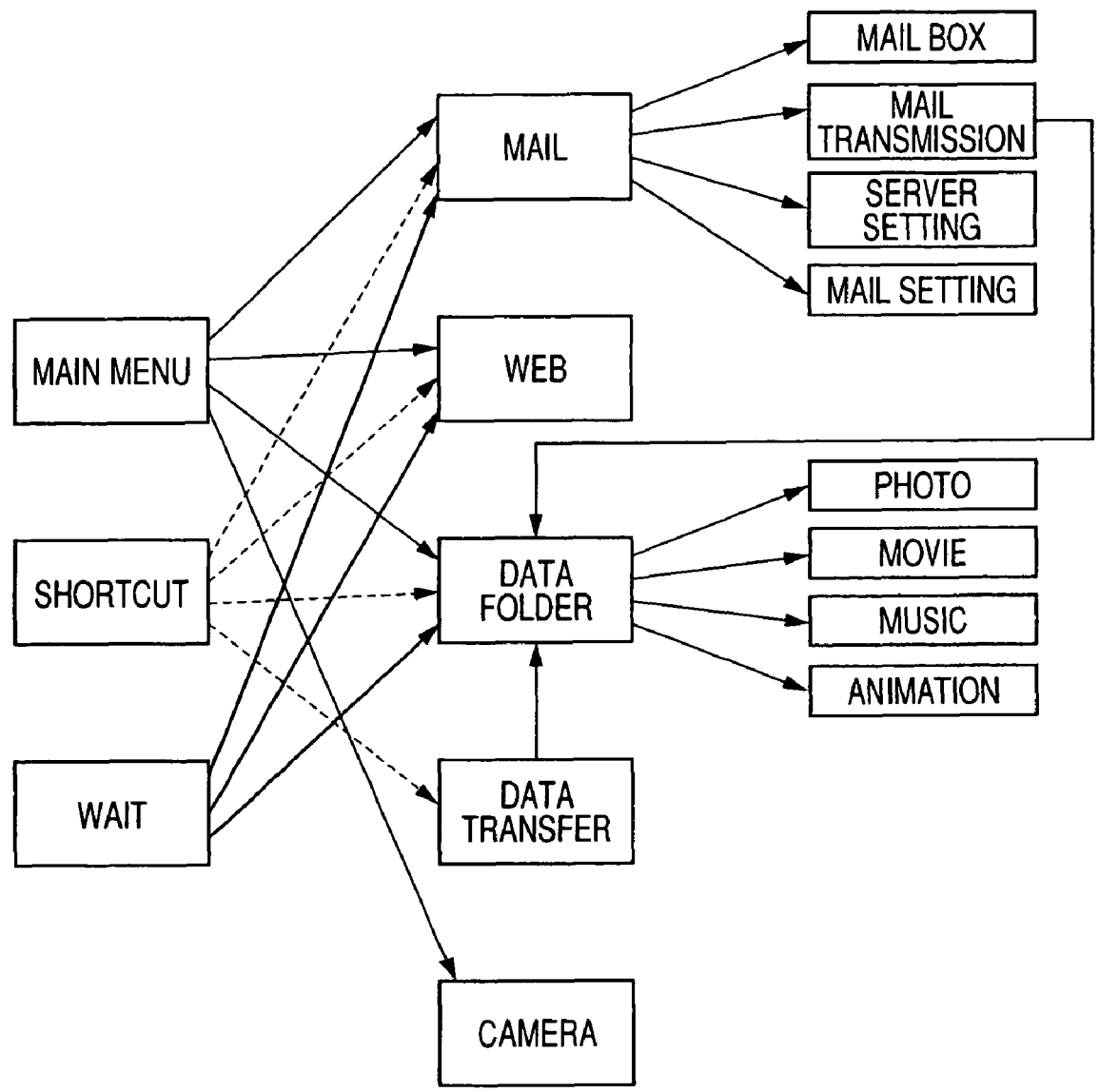
FIG. 4 is a diagram for explaining the scene-to-scene transition in the mobile phone.

FIG. 4 typically shows a state of a scene-to-scene transition to be made based upon the scene-to-scene transit information 30. For example, according to the scene-to-scene transit information 30, there are settings of scenes "mail", "Web", "data folder", "camera", etc. as destinations from a source scene "main menu". It can be seen that transition is possible to the scene "mail", "Web", "data folder", "camera" or the like from the scene "main menu". Meanwhile, scenes "mail box", "send mail", "set server", "mail setting", etc. are established as destinations from the scene "mail". It can be seen that transition is possible to the "mail box", "send mail", "set server", "mail setting" or the like from the scene "mail" when transition is made from the scene "main menu" to the scene "mail".

In the scene-to-scene transit information 30, there are setting of scenes "main menu", "shortcut", "wait", "transition data", "send mail", etc. as destinations from the scene "data folder". There are setting of scenes "photo", "movie", "wait", "music", "animation", etc. as destinations from the scene "data folder". For this reason, when making a transition via the scene "data folder" for example, transition is made to the scene "data folder" from any of the source scenes "main menu", "shortcut", "wait", "transition data", "send mail", etc., followed by a transition to a destination scene "photo", "movie", "wait", "music" or "animation".

FIG. 5 shows a figure of transition of a screen to be displayed on the liquid-crystal display 22 in the scene-to-scene transition process executed based on the scene-to-scene transit information 30. On the main menu screen 40A, a destination list column 41 is displayed indicating destinations such as mail, Web, data folder, camera and the like as established in the scene-to-scene transit information 30. In case the user selects data folder for example, a data-folder screen 40B is displayed on the liquid-crystal display 22. Meanwhile, on the shortcut screen 40C, a destination list column 41 is displayed indicating destinations such as mail, Web, data folder, data transfer and the like as similarly established in the scene-to-scene transit information 30. In case the user selects data folder for example, a data-folder screen 40B is similarly displayed on the liquid-crystal display 22.

On the data-folder screen 40B, a destination list column 41 is displayed indicating destinations such as photo, movie, music, animation and the like. In case the user selects animation for example, an animation screen 40D is displayed. When selecting music for example, a music screen 40E is displayed. On the animation screen 40D, a destination list column 41 is displayed indicating destinations, for example, of various animations stored in the storage section 17. Likewise, on the music screen 40E, a destination list column 41 is displayed indicating destinations, for example, of various pieces of music stored in the storage section 17.

In the mobile phone 1, scene-to-scene transition is implemented in this manner based on the scene-to-scene transit information 30. Where there are a multiplicity of scenes established as destinations in the scene-to-scene transit information 30 like the main menu screen 40A for example, the user is obliged to move the cursor or scroll the screen when he/she selects and invokes a destination scene to transit, thus requiring time and labor in operation. Meanwhile, where the user invokes a desired scene on the mobile phone 1, he/she frequently performs operation by way of a scene-to-scene transition route fixed in a certain degree. Consequently, when performing scene-to-scene transition, the mobile phone 1 is allowed to present, as a candidate of destination, the scene selected the most frequently as the next destination when invoked through the same route in the past. By user's selection of and transition to a destination scene out of the candidates presented, the user is allowed to invoke a desired scene with less operation steps, thus reducing the operation burden on the user.

Therefore, the mobile phone 1 during scene-to-scene transition determines a destination candidate depending upon the use frequency of a route to a scene to transit and presents it to the user. The storage section 17 has a frequency-information storage area 17b for storing transit frequency information 31 representative of a use frequency of scene-to-scene transition. The transit frequency information 31 has source information 31a representative of a source of transition, first destination information 31b representative of a destination (first destination) from the source, second destination information 31c representative of a destination (second destination) from the first destination and use-frequency information 31d representative of use frequency, that are associated one with another. The use-frequency information 31d represents a use frequency (e.g. number of times) of a route passing, in order, through the source, the first destination and the second destination.

According to FIG. 6 for example, there is shown that the number of times of using a route is five in the transition from the source scene "main menu" to the first destination scene "mail" and from the scene "mail" to the second destination scene "mail box" while the number of times of using a route is four in the transition from the source scene "main menu" to the first destination scene "mail" and from the scene "mail" to the second destination scene "send mail".

Figure 7:
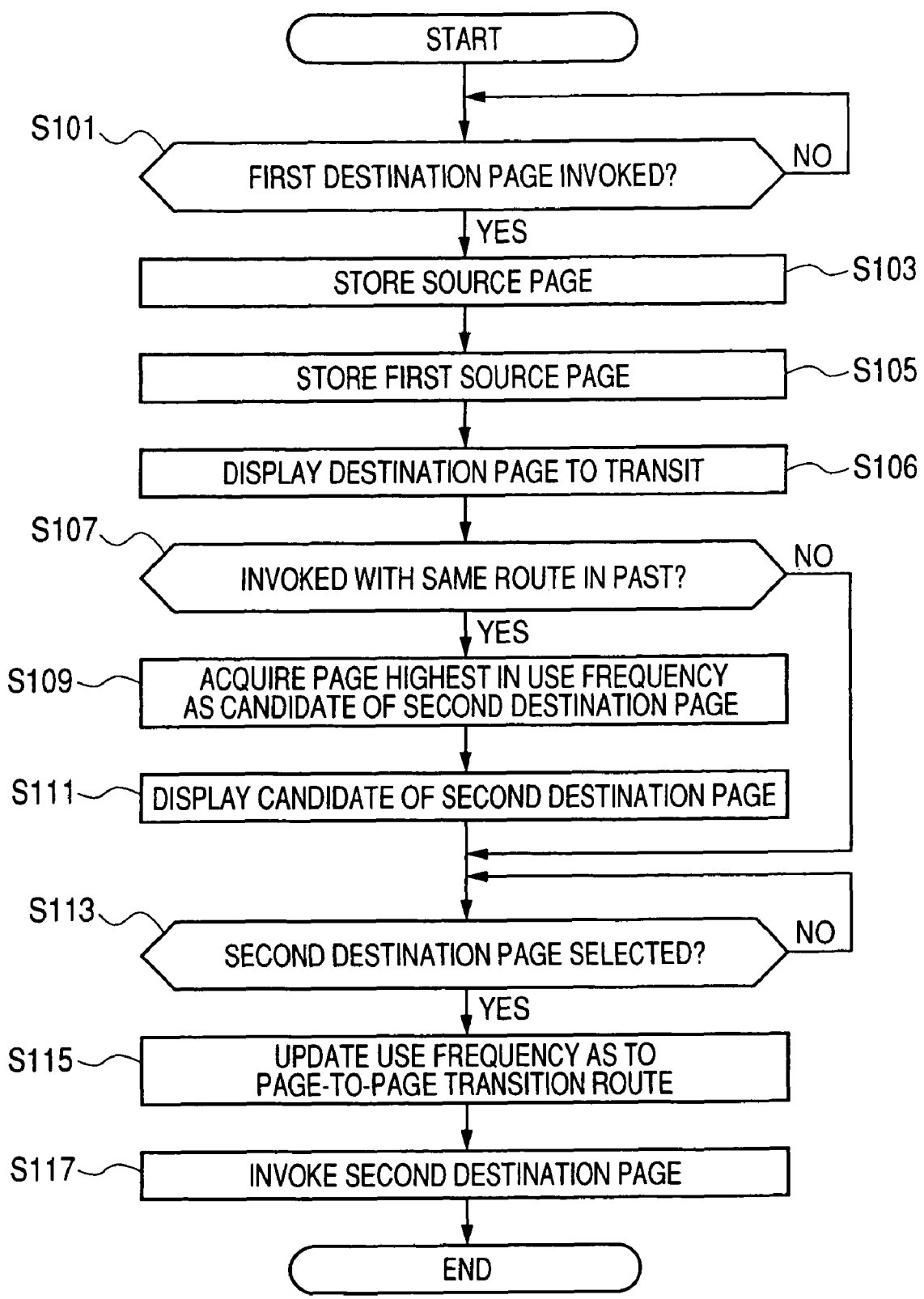
FIG. 7 is a flowchart showing a procedure of scene-to-scene transition in the mobile phone.

Here, based on a flowchart shown in FIG. 7, explanation is made on the procedure that the mobile phone 1 executes a scene-to-scene transition process by use of the scene-to-scene transit information 31. It is assumed that there is first invoked a scene "main menu" wherein a main menu screen is displayed on the liquid-crystal display 22. From now on, the term "step" is omitted in explanation, e.g. "step S101" is as "S101".

Figure 8:
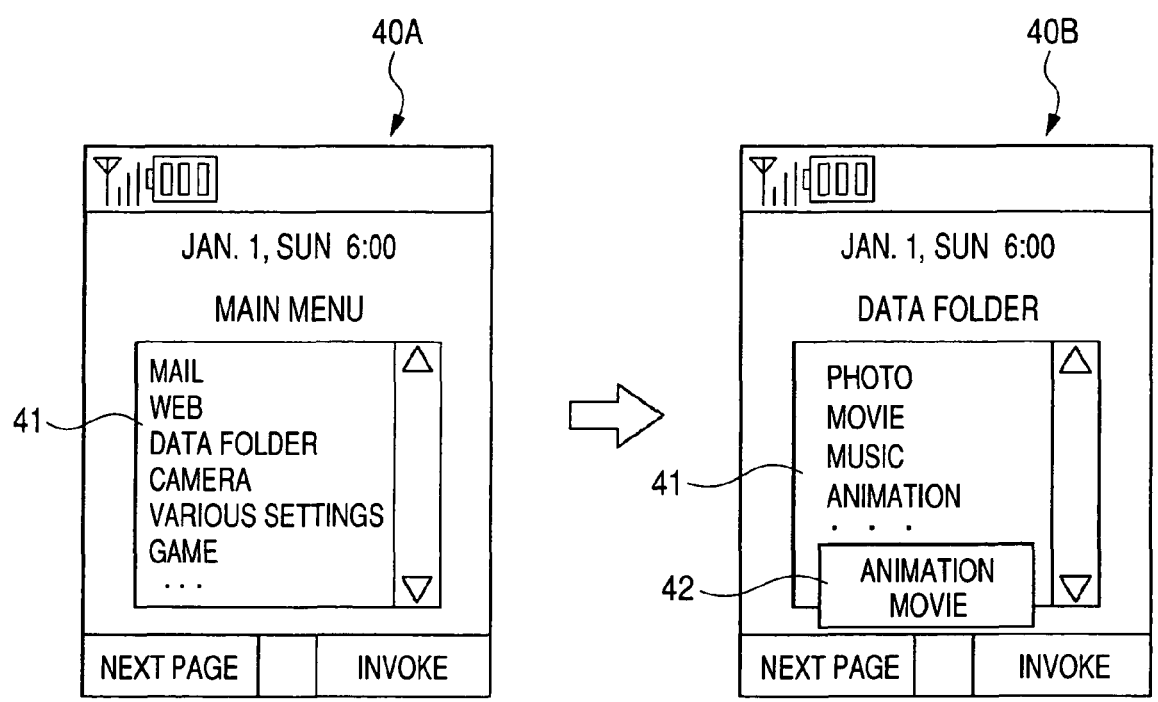
FIG. 8 is a scene-to-scene transition figure showing a screen upon performing scene-to-scene transition in the mobile phone.

When a menu screen 40A as shown in FIG. 8 is displayed as a source scene on the liquid-crystal display 22, the user is allowed to select and invoke a desired destination (first destination) out of the destinations being displayed in the menu screen 40A. The main control section 10 determines whether or not the user selected and invoked a first destination scene (S101). When a first destination scene is not invoked (No at S101), the main control section 10 waits until a first destination scene is selected.

When a first destination scene is invoked (Yes at S101), the main control section 10 stores the initially invoked scene (scene "main menu" in this case) as a source scene in the storage section 17 (e.g. RAM) (S103). Incidentally, at this time, the source scene is merely temporarily stored but not yet stored in the frequency-information storage area 17b.

The main control section 10 stores the scene selected and invoked at S101, as a first destination scene, in the storage section 17 (e.g. RAM) (S105). It is assumed here that a scene "data folder" is selected and invoked to be stored as a first destination. Incidentally, at this time, the first destination scene is merely temporarily stored but not yet stored in the frequency-information storage area 17b.

When taking the scene invoked at S101 as source information 30a out of the scene-to-scene transit information 30 stored in the transit-information storage section 17a, the main control section 10 acquires destination information 30b associated therewith. The scene, the relevant destination information 30b indicates, is displayed as a scene to transit (S106). For example, the destination list column 41 in a data-folder screen 40B shown in FIG. 8, there are displayed items "photo", "movie", "music", "animation" and so on that are associated with the scene "data folder" in the scene-to-scene transit information 30.

Figure 9:
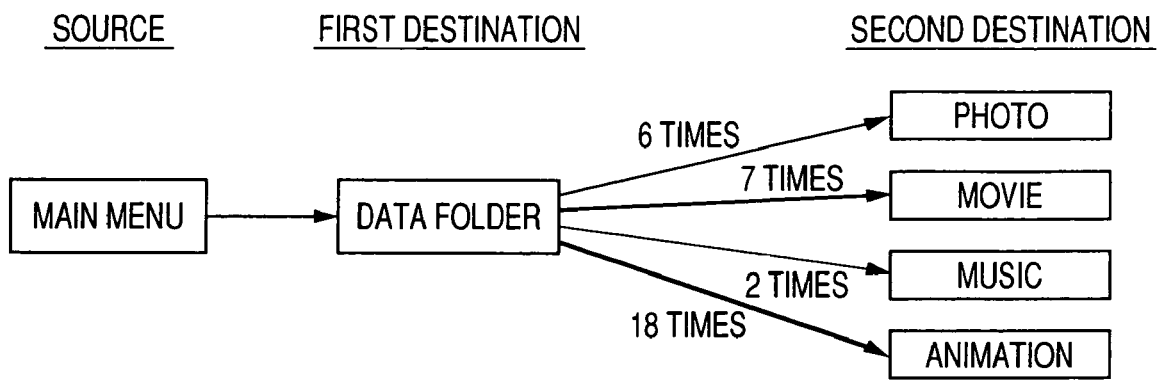
FIG. 9 is a figure for explaining an example of scene-to-scene transition in the mobile phone.

The main control section 10 determines whether or not the source scene initially invoked and the first destination scene invoked at S101 have the same route as invoked in the past (S107). This determination is made by whether the scene initially invoked as source information 31*a* has one or more pieces of use-frequency information 31*d* associated with the scene invoked at S101 as first destination information 31*b*, in the transit frequency information 31 stored in the frequency-information storage area 17*b*. For example, in the example shown in FIG. 9, for the source scene "main menu" and the first destination scene "data folder, there are stored a second destination scene "animation" as 18 times of use frequency, a scene "movie" as 7 times of use frequency, a scene "photo" as 6 times of use frequency, and a scene "music" as 2 times of use frequency, in the transit frequency information 31. Consequently, determination is made as invoked through the similar route in the past.

In the case that invoked with the same route in the past (yes at S107), the main control section 10 acquires a scene higher in use frequency as a candidate of second destination scene (S109). For example, the main control section 10 acquires two second destination scenes higher in use frequency. For example, in the transit frequency information 31 shown in FIG. 9, where transition is from the scene "main menu" to the scene "data folder", the route to the next scene "animation" is the greatest, i.e. 18 times of use frequency. Meanwhile, the route to the scene "movie" is the second greatest, i.e. 7 times of use frequency. This means that, in the case of transition from the scene "main menu" to the scene "data folder", the scene "animation" is the greatest in use frequency to be invoked the next while the scene "movie" is the second greatest in frequency to be invoked. Accordingly, the main control section 10 acquires scenes "animation" and "movie" as candidates for the second destination.

The main control section 10 displays the candidate for a second destination scene acquired at S109 (S111). On this occasion, the main control section 10 displays a destination-candidate column 42 indicating the candidates for a second destination scene over a destination list column 41, as the screen 40B shown in FIG. 8 for example. Here, the scenes "animation" and "movie" acquired at S109 are displayed in the destination-candidate column 42. By making a focusing to the scene "animation" the greatest in use frequency, the user is allowed to invoke the scene "animation" or "movie" being displayed in the destination list column 41 with the reduced numbers of operation steps.

The main control section 10 determines whether or not a second destination scene was selected on the destination list column 41 or the destination-candidate column 42 through the operation key 21 by the user (S113). When a second destination scene was not selected (no at S113), the main control section 10 waits until a second destination scene is selected.

When a second destination scene is selected (yes at S113), the main control section 10 updates the use frequency of the route of scene-to-scene transition (S115). Namely, the main control section 10 updates the use frequencies associated with the source scene stored at S103, the first destination scene stored at s105 and the second destination scene selected at s113. Here, in case "animation" is assumed selected at S113, the use frequency associated with the source scene "main menu", first destination scene "data folder" and second destination scene "animation" is added 1 time to the former 18 times into 19 times.

Figure 11:
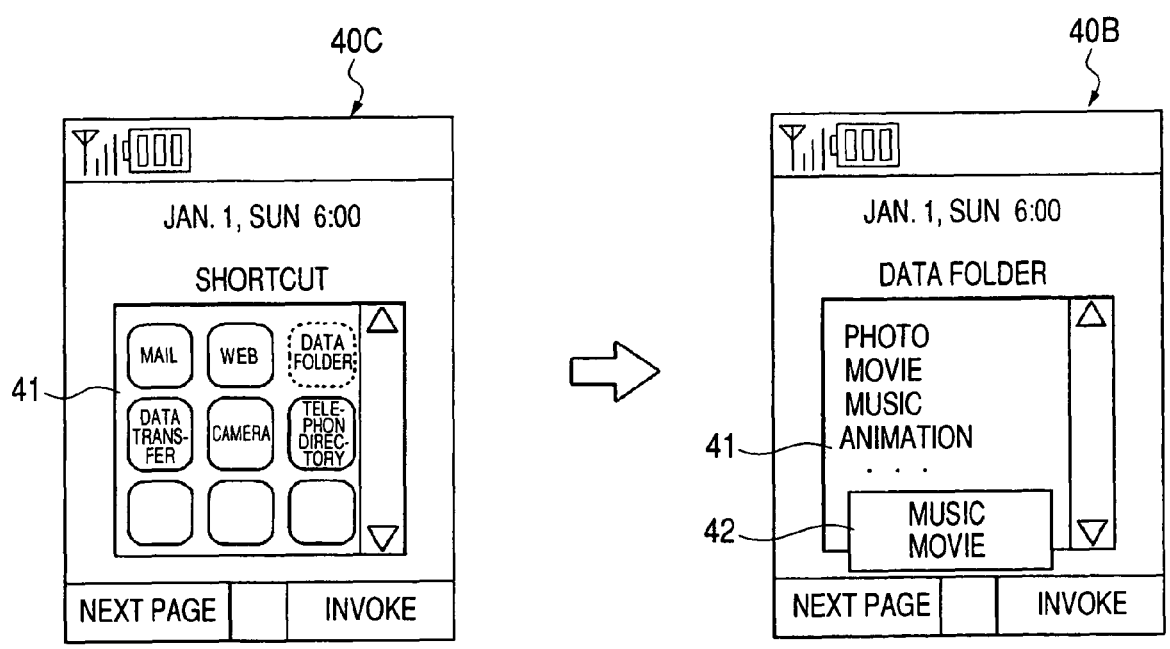
FIG. 11 is a screen transition figure showing a screen upon performing scene-to-scene transition in the mobile phone.

Finally, the main control section 10 invokes the scene selected at S113 (S117). Here, the main control section 10 invokes the scene "animation" as shown in FIG. 11. By repeating the process of S101 to S117 in the mobile phone 1, screen transition is made to update the transit frequency information 31.

Figure 10:
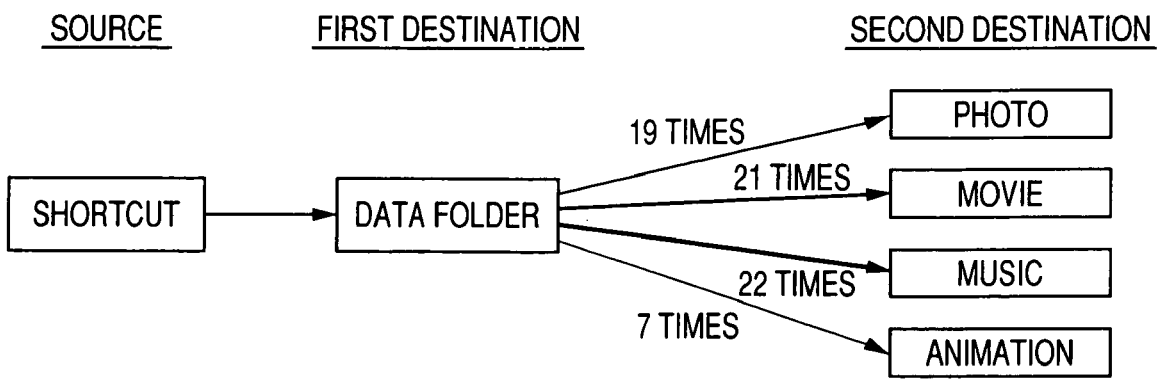
FIG. 10 is a figure for explaining an example of scene-to-scene transition in the mobile phone.

Based on FIGS. 10 and 11, explanation is made, for example, on the case that "shortcut" is initially invoked as a source scene. It is assumed that transition is from the source scene "shortcut" to a first destination scene "data folder", as shown in FIG. 10. On this occasion, there is initially displayed a shortcut screen 40C as shown in FIG. 11. In this case, when a scene "data folder" is selected at s101, the source is the scene "shortcut" and the first destination is the scene "data folder" according to the transit frequency information 31. For the second destination, use frequency is 22 times to the scene "music", 21 times to the scene "movie", 19 times to the scene "photo", and 7 times to the scene "animation". This means that, when transition is from the scene "shortcut" to the "data folder", the scene "music" is to be next invoked at the greatest frequency while the scene "movie" is to be invoked at the second greatest frequency, as shown in FIG. 10.

Consequently, the main control section 10 acquires the scene "music" the greatest in use frequency and the scene "movie" the second greatest in use frequency, as second destinations. Then, the main control section 10 at S111 displays a destination-candidate column 42 indicating the items of the scene "music" and "movie" acquired at s109.

Namely, when transition is from the scene "main menu" to the scene "data folder" depending upon the use frequency of a route of scene-to-scene transition, "animation" and "movie" are preferentially indicated as destination candidates. When transition is from the scene "shortcut" to the scene "data folder", "music" and "movie" are preferentially indicated as destination candidates. It can be seen that, even where the same scene "data folder" is invoked, the scene indicated as a destination candidate differs depending upon the route taken so far.

In this manner, in the mobile phone 1, each time scene-to-scene transition is done, update is made on the use frequency of the route of the scene-to-scene transition. When transition is from the source scene to a first destination and a second destination is indicated as a next destination on the mobile phone 1, the destination is indicated preferentially whose route is the highest out of second destinations. This allows the user to transit the scene by use of a route the highest in use frequency with the less operation steps when he/she performs scene-to-scene transition on the mobile phone 1.

Incidentally, even in case all the total up to now is stored as use-frequency information 31*d* of transit frequency information 31, the recent information (e.g. use frequency of the recent 100 times, use frequency in the recent three months) only may be stored with the older information deleted.

Meanwhile, the embodiment used the use frequency on the route through the three stages of the source scene, destination scene and second destination scene. However, this is not limitative, i.e. use frequency may be on the route through the scene-to-scene transition including much more stages.

According to the embodiment, the route of scene-to-scene transition is recorded each time scene-to-scene transition is made based on user's instruction. When the user performs scene-to-scene transition in order to invoke a desired scene, selected and presented to the user a destination higher in use frequency in the scene-to-scene transitions done so far by use of the routes of scene-to-scene transitions, thus making it possible to relieve the user of the operation burden of scene-to-scene transition.

According to the above-described embodiment, when the user performs scene-to-scene transition in order to invoke a predetermined scene, the user can be relieved of the operation burden in scene-to-scene transition by presenting a destination candidate selected in consideration of a route of scene-to-scene transition made so far.

The embodiment is explained on the mobile phone 1. However, this is not limitative, i.e. an information processing apparatus, such as a PHS (personal handyphone system) or a PDA (personal digital assistant), is applicable.

What is claimed is:

1. A mobile phone, comprising:
   a first storage configured to store transit information associated with a destination scene for each scene among a plurality of scenes which are transited through on the mobile phone;
   a second storage configured to store frequency information representing a frequency as to a route passing through a source scene, a first scene which is transited from the source scene and a second scene which is transited from the first scene, in order;
   a first display configured to selectably display a candidate of the second scene, depending upon a transition from the source scene to the first scene and upon the transit information;
   a second display configured to selectably display a candidate of the second scene, depending upon a transition from the source scene to the first scene and upon the frequency information; and
   a transit unit configured to transit from the candidate of the second scene displayed by either one of the first display and the second display to a scene of the candidate of the second scene if the displayed candidate of the second scene is selected.

2. The mobile phone according to claim 1, wherein the second display puts and displays a focus in a position of a candidate highest in frequency when the candidate of the second scene is displayed by the second display.

3. The mobile phone according to claim 1, wherein the use frequency of the route consists of a recent predetermined number of times of the use frequency.

4. The mobile phone according to claim 1, wherein the second display extracts a predetermined number of routes highly frequent to use, and
   wherein the second display acquires and displays a candidate of the second scene through which transition is made on the extracted route.

* * * * *